Jan. 10, 1950     H. N. FAIRBANKS     2,494,038
CONTROL ARRANGEMENT FOR PHOTOGRAPHIC CAMERAS
Filed May 25, 1946     2 Sheets-Sheet 1
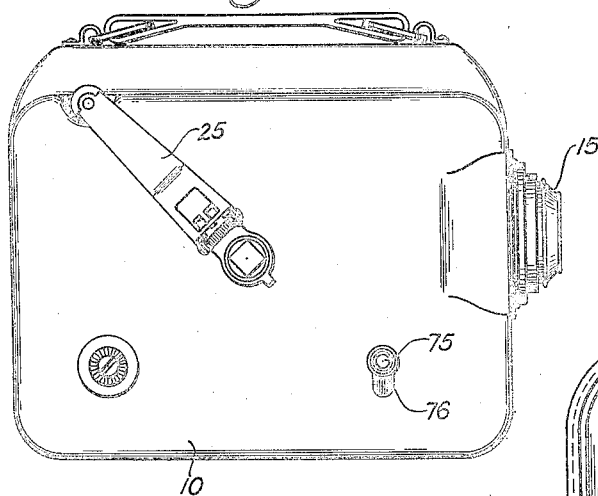
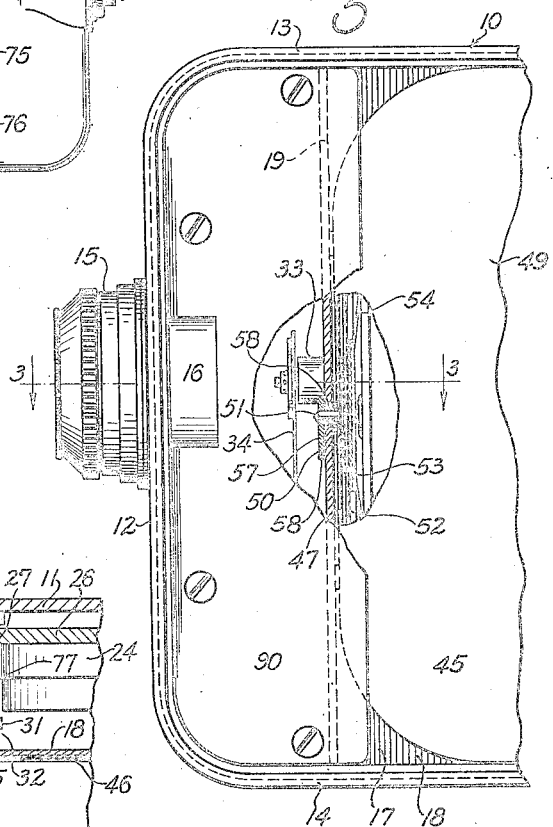
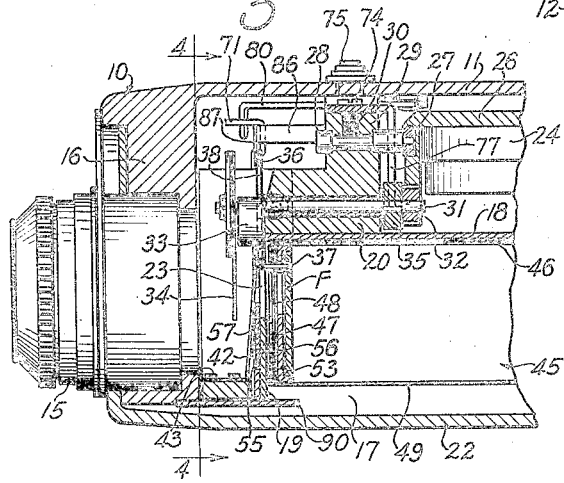
Henry N. Fairbanks
INVENTOR
Newton M. Perrins
BY George A. Gill Jr.
ATTORNEYS

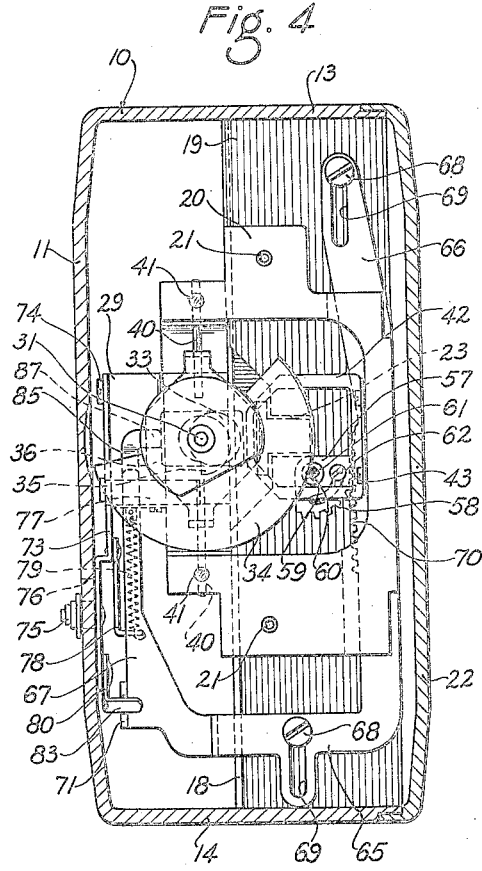
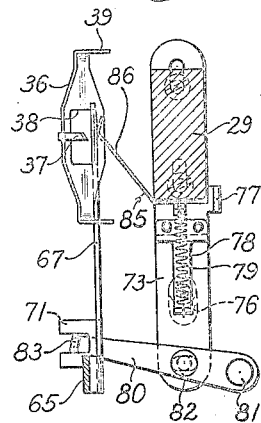
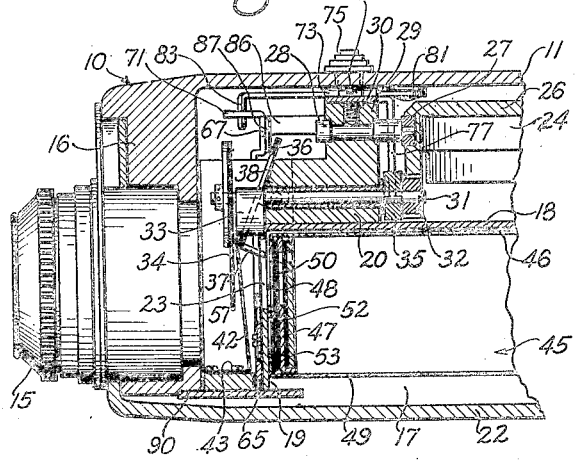

Patented Jan. 10, 1950

2,494,038

UNITED STATES PATENT OFFICE 2,494,038

CONTROL ARRANGEMENT FOR PHOTOGRAPHIC CAMERAS

Henry N. Fairbanks, West Hollywood, Calif., assignor to Eastman Kodak Company, Rochester, N. Y., a corporation of New Jersey Application May 25, 1946, Serial No. 672,294

6 Claims. (Cl. 88—18.4)

This invention relates to a control arrangement for a photographic camera and more particularly to a motion picture camera of the magazine type.

In order to prevent light from entering the exposure aperture in a film magazine and, hence, fogging the film, it is customary to provide a shutter on the magazine which will cover the exposure aperture when the magazine is to be interchanged with respect to the apparatus. Such a shutter means should also cover the aperture through which the film advancing claw projects into the magazine to engage the perforations of the film therein. It is desirable, therefore, to provide a means whereby the shutter is automatically moved to its aperture covering position and the claw retracted from its engagement with the film so that the magazine may be readily removed from the apparatus. Such an automatic means should also be capable of opening the shutter and inserting the claw into the magazine when the magazine is positioned in the apparatus and ready for the exposure of the film.

The primary object of the present invention is to provide a magazine camera having a magazine shutter operating means and a film claw retractor which are operated simultaneously by a manually operable means for the film advancing means.

Another object of the invention is to provide a magazine shutter operating means and a claw retractor operated by the manually operable means for the film advancing means so that the shutter is opened and the claw inserted in the film magazine before the film advancing means is fully released.

A further object of the invention is to provide a single actuating means which will open the shutter and permit the claw to enter the film magazine before the film advancing means is released.

And yet another object of the invention is to provide a magazine camera in which the magazine shutter is normally closed and the claw normally held in its retracted position until the film is actually to be exposed.

These and other objects of the invention will be apparent from the following description.

The above objects of the invention are embodied in a magazine camera comprising the combination with a casing providing a magazine chamber for a film magazine, a cover for enclosing the magazine chamber, and a film advancing means including a claw member for entering the magazine to move a film therein, of a shutter operating means in said casing and movable to open and close a shutter on the magazine, a claw retracting means for withdrawing said claw from the film magazine, an actuating means in the casing for moving said shutter operating means and for holding said claw member in its retracted position, and a manually operable means on the casing for moving said actuating means so as to permit the shutter to be opened and the claw member inserted in the film magazine before the film advancing means is fully released.

It is well known that the cover of a camera may be used to actuate the shutter operating means for opening and closing a magazine shutter, that the latching means for the cover may actuate the shutter operating means and the claw retractor independently of each other, or that the shutter may itself act to remove the claw member from the magazine. However, the present invention is directed to the operation of a magazine shutter operator and claw retractor which is a single lever but which permits the shutter to open and the claw to enter the magazine before the film advancing means is fully disengaged.

Reference is now made to the accompanying drawings wherein similar reference characters designate similar parts and wherein:

Fig. 1 is a side elevation of a camera of the magazine type embodying my invention and showing the handle for winding the spring motor and the actuating or release button for the camera;

Fig. 2 is an enlarged side elevation of the camera with the cover removed and showing a portion of the film magazine at the gate in section;

Fig. 3 is a section taken substantially on the line 3—3 of Fig. 2 and showing the relation of the various parts when the film advancing means has been released for exposing the film in the magazine;

Fig. 4 is a section taken substantially on the line 4—4 of Fig. 3 and showing the relation of the various parts in elevation when the film advancing means has been released for exposing the film in the magazine;

Fig. 5 is a sectional view similar to Fig. 3 but showing the parts in their normal position with the magazine shutter in its closed position, the claw member in its retracted position and the film advancing means at rest;

Fig. 6 is a detail view showing the claw member and the portion of the actuating means for holding the claw member in its normal retracted position with the manually operable means in its position for maintaining the film advancing means at rest; and Fig. 7 is a view similar to Fig. 6 but showing the relation of the various parts when the film advancing means has been released.

In the illustrated embodiment of the invention, the photographic apparatus comprises a camera casing 10 having a side wall 11, a front wall 12, a top wall 13, and a bottom wall 14. An objective 15 is attached in any suitable manner to the front wall 12 or to a frame block 16 formed integral with the walls 11 and 12.

The casing 10 provides a magazine chamber 17 which has one side formed by the longitudinal mechanism plate 18 and its front wall formed by a front plate 19 which is fastened to the frame member 20 to form an integral part therewith. The frame member 20 is secured to the block 16 by screws, the tapped holes being indicated at 21 in Fig. 4. The open side of magazine chamber 17 is enclosed by the camera cover 22 which interengages with the edges of the casing 10. The plate 19 is provided with an aperture 23 which is in alignment with the objective 15 and which has an enlarged cut-away portion through which the film advancing claw may extend.

The film advancing and shutter means may be provided in the usual fashion or in the manner disclosed and now to be described. A spring motor 24 which is wound by the handle 25 has a crown gear casing 26 provided with a peripheral groove engaged by a guide roller 27. The guide roller 27 is rotatably mounted on the end of an eccentric stud 28 journalled in a portion 29 of the frame member 20 and held in an adjusted position by the set-screw 30. A shaft 31 is also journalled in the member 20 and has fixed to an end thereof a pinion 32 which meshes with the crown gear casing 26. The shaft 31 has formed integral therewith an eccentric 33 and also carries the camera shutter 34 adjacent the eccentric. A single toothed ratchet member 35 is also fixed to the shaft 31 between the frame member 20 and the pinion 32.

The film advancing means comprises a claw member 36 having a claw tooth 37 and provided with a central opening 38 to receive the eccentric portion 33 of the shaft 31. The claw member 36 is mounted for vertical reciprocating motion and includes ears 39 engaging pins 40 which are mounted in the frame member 20 and secured in position by the set screws 41. A spring member 42 is secured to the side wall of the frame member 20 by the screws 43 and bears against the claw member 36 normally to urge the claw tooth 37 through the aperture 23 in plate 19 and into the aperture of the film magazine in chamber 17. The claw tooth 37 is provided with a beveled edge so as to be cammed out of the film perforations in a known manner upon upward movement of the claw member 36.

The film magazine may be of any standard design including a shutter for covering the film and claw apertures therein. Such a film magazine 45 may comprise a casing 46 having a front lateral wall 47 provided with at least one T-shaped aperture 48. The magazine casing 46 is enclosed by a cover 49. A magazine shutter 50 is mounted on a square pin 51 which extends through the front lateral wall 47 of the magazine. This magazine shutter 50 is held against the front lateral wall 47 by a front floating gate member 52 and a pressure pad 53 urged forwardly in the magazine by a spring member 54, see Fig. 2. The film F passes between gate member 52 and the pressure pad 53 and its perforations are engaged by the claw tooth 37 for intermittent advancement thereof. The magazine shutter 50 is arranged and formed so that it is movable by the square pin 51 into a closed position covering the T-shaped aperture 48 in the front magazine wall 47 and may be moved into open position by rotation of square pin 51 so that an image may be projected from objective 15 through aperture 23, aperture 48, and a corresponding aperture in the gate member 52 to the film F. The floating gate 52 in the magazine is located in the focal plane of the objective 15 by means of a plurality of pins 55 on the plate 19 which enter the magazine casing to engage the pins 56 on the gate member 52.

The shutter operating means for the magazine may comprise a sector 57 having a toothed periphery 58 and provided with an arcuate slot 59 and a square aperture 60. The sector has a bushing portion 61 which is concentric with the aperture 60 and journalled in the plate 19, see Figs. 2 and 4. A screw 62 passes through arcuate slot 59 and is threaded into the plate 19. As a result, the square aperture 60 of sector 57 receives the square pin 51 on the magazine shutter 50 when the magazine 45 is inserted into the chamber 17 and said sector 57 may be rotated to open or close said magazine shutter 50. The position of the sector 57 shown Fig. 4 corresponds to the open position of the shutter 50.

The actuating means comprises a U-shaped lever 65, see Fig. 4, having extensions 66 and 67 and arranged so as to be slidably mounted on the plate 19 by means of the studs 68 in the slots 69. The extension 66 is provided with a rack portion 70 for engaging the toothed periphery 58 of the sector 57. The other extension 67 is utilized to hold the claw member 36 in its retracted position and is also provided with a bifurcated formed out portion 71.

The manually operable means comprises a lever 73, see Figs. 4, 6 and 7, which is mounted on the portion 29 of the member 20 by means of the screws 74 and has secured thereto a button 75 which extends through the wall 11 in the slot 76 so that the lever 73 can be operated from the outside of the camera. The lever 73 is also provided with an extension 77 which lies directly below and in the path of the single tooth ratchet 35 and with a T-shaped member 78 which is secured thereto and to which one end of the spring 79 is fixed. The other end of the spring 79 is secured in any suitable manner, such as a pin, to the under side of the portion 29 of the frame member 20. The spring 79 serves to retain the lever 73 in the position shown in Fig. 6.

The intermediate lever 80 is pivotally mounted to the casing 10 by the stud 81 and is also pivotally connected to the lever 73 by the stud 82. The lever 80 is provided with a formed over portion 83 which engages the bifurcated portion 71 of the lever 65.

The claw retracting means comprises a spring member 85 which is secured to the portion 29 of the frame member 20. The member 85 is provided with an angularly offset portion 86 having a nose 87 which engages the claw member 36, as shown in Figs. 3, 4 and 7.

The operation of the control means according to the invention will now be described. When the magazine chamber 17 is empty, the lever 73 is in the position shown in Fig. 6 and the extension 77 is held by the spring 79 in the path of the single tooth ratchet 35 to lock the spring motor 24; the claw member 36 is in its retracted position, as shown in Figs. 5 and 6; and the lever 65 will be in its uppermost position with the sector 57 rotated through 90° from the position shown in Fig. 4. With the various elements in their normal position, the camera cover 22 may be opened and the magazine 45 can be inserted into the chamber 17. A cover plate 90 encloses the camera control elements, as shown in Fig. 2, and extends over the plate 19 to compel a tilting of the magazine during insertion. As the magazine is inserted, the square pin 51 of the magazine shutter 50 enters the square aperture 60 of the sector 57. The cover 22 may then be closed to enclose the magazine chamber, and the camera is then ready for the exposing of the film.

Assuming that the spring motor 24 has been fully wound by means of the handle 25, the button 75 is moved downward to make the exposure. As the button 75 is moved downward, the lever 73 is moved therewith, and the extension 77 is also moved downward and away from the single tooth ratchet 35. The instant that the lever 73 starts to move, the motion is transmitted to the lever 80 which moves the lever 65 downward. As the lever 65 is moved downward, the rack portion 70 on the extension 66 rotates the sector 57 and, hence, the shutter 50 since the pin 51 is in engagement with the sector 57. The extension 67, which normally holds the retractor 85 and, hence, the claw member 36 in the retracted position, as shown in Fig. 6, is also moved downwardly to disengage itself from the member 85 so as to permit the claw tooth 37 to be urged by the spring 42 into the magazine to engage the film contained therein. At the instant the claw enters the magazine 45, the shutter 50 will have been fully opened, the extension 67 will no longer be in engagement with the offset portion 86 of the member 85, and the extension 77 will have then cleared the ratchet 35 to permit the spring motor 24 to run. The various parts will then be in the positions shown in Figs. 3, 4 and 7.

When the button 75 is released and since the levers 65, 80 and 73 are inter-connected, the spring 79 will return them to their normal positions. The first portion of movement of the lever 73 to its normal or rest position, places the extension 77 in the path of the ratchet 35 to stop the spring motor 24 and to start the closing of the magazine shutter 50. It will be noted from Fig. 7, that some movement of the lever 65 must take place before the extension 67 is brought into contact with the portion 86 of the claw retractor 85 to pivot the claw member 36 about the pins 40 to remove the claw 37 from the magazine 45. It will also be noted from Fig. 6 that the extension 67 overtravels the nose 87 on the member 85 in order to permit the shutter 50 to be fully closed. The arrangement of the levers 65, 80 and 73 is such that when the button 75 is moved downward, the shutter 50 is opened and the claw 37 inserted in the magazine 45 before the film advancing means, i. e., the spring motor 24 and the shutter 34 associated therewith, are fully released. Likewise, when the button 75 is released, the film advancing means is arrested before the shutter 50 is closed and the claw 37 removed from the magazine 45.

With the present arrangement, the film in the magazine is protected at all times against fogging except when actually being exposed. Further, the proposed arrangement also insures against the loss of any film due to fogging caused by light leaks in the camera itself.

Since many modifications or variations of the construction shown are possible, the scope of the invention is not to be limited to the illustrated embodiment but is defined by the appended claims.

I claim:

1. In a photographic apparatus, the combination with a casing providing a magazine chamber and provided with an exposure aperture, a film magazine within said chamber provided with an exposure aperture and having a shutter movable to opened and closed positions with respect to said aperture, a film advancing means including a clutch member and a claw for entering the exposure aperture of said magazine and for moving the film therein, a shutter operating means on said casing and adapted to open and close the shutter in said magazine, an actuating means in said casing and movable to actuate said shutter operting means and for permitting said claw to enter into and to be retracted from said exposure aperture of said magazine, and a manually operble release means for disengaging and engaging said clutch member, of an operative connection actuated by said release means and operating said actuating means to open and close the magazine shutter and to permit said claw member to enter into and to be retracted from said exposure aperture each time that said release means is moved respectively to disengage and engage said clutch member.

2. In a photographic apparatus, the combination with a casing having a frame member provided with an exposure opening and providing a magazine chamber adapted to contain a film magazine, a film advancing means including a claw member resiliently urged into the magazine and for moving a film therein, a shutter operating means rotatably mounted on said frame member for engaging a shutter member of the film magazine and movable to open and close said shutter, an actuating means slidably mounted on said frame member and adapted to actuate said shutter operating means and to permit said claw member to enter into or be retracted from said magazine, and a manually operable release means slidably mounted on said casing for disengaging and engaging said film advancing means, of an operative connection actuated by said release means and operating said actuating means to rotate said shutter operating means to open and close the magazine shutter and to permit said claw member to enter into and to be retracted from said magazine each time that said release means is moved respectively to disengage and engage said film advancing means.

3. In a photographic apparatus, the combination with a casing having a frame member provided with an exposure opening and providing a magazine chamber adapted to contain a film magazine, a cover for enclosing said magazine chamber, a film advancing means including a clutch member and a claw member resiliently urged into the magazine and for moving a film therein, a shutter operating means rotatably mounted on said frame member for detachably engaging a shutter member of the film magazine in said chamber, having a circular toothed sector, and movable to open and close said shutter member, an actuating means slidably mounted on said frame member having a rack portion for engaging the toothed sector on said shutter operating means and a portion for permitting the claw member to enter into and to be retracted from said magazine, and a manually operable release means slidably mounted on said casing for disengaging and engaging said clutch member, of an operative connection actuated by said release means and operating said actuating means to rotate said shutter operating means to open and close the magazine shutter and to permit said claw member to enter into and to be retracted from said magazine each time that said release means is moved respectively to disengage and engage said film advancing means.

4. In a photographic apparatus, the combination with a casing having a frame member provided with an exposure aperture and providing a magazine chamber adapted to contain a film magazine, a cover for enclosing said magazine chamber, a film advancing means including a claw member resiliently urged into the magazine for moving a film therein, a claw retracting means on said frame member engaging said claw, a shutter operating means rotatably mounted on said frame member and movable to open and close the shutter in said magazine, an actuating means on said frame member and movable to actuate said shutter operating means and to disengage and engage said claw retracting means to permit the movement of said claw member into and the retraction from said magazine, and a manually operable release means on said casing for disengaging and engaging said film advancing means, of an operative connection actuated by said release means and operating said actuating means to rotate said shutter operating means to open and close the magazine shutter and disengage and engage said retracting member each time that said release means is moved respectively to disengage and engage said film advancing means.

5. In a photographic apparatus, the combination with a casing having a frame member provided with an exposure aperture and providing a magazine chamber adapted to contain a film magazine, a cover for enclosing said magazine chamber, a film advancing means including a clutch member and a claw member resiliently urged into the magazine and for moving a film therein, a claw retracting means on said frame member for engaging said claw, a shutter operating means rotatably mounted on said frame member for detachably engaging a shutter member of the film magazine in said chamber, having a circular toothed sector, and movable to open and close said shutter member, an actuating means slidably mounted on said frame member and having a rack portion for engaging the toothed sector on said shutter operating means and a portion for disengaging and engaging said claw retracting means to permit said claw to enter into or to be retracted from the magazine, and a manually operable release means slidably mounted on said casing for disengaging and engaging said clutch member, of an operative connection actuated by said release means and operating said actuating means to rotate said shutter operating means to open and close the magazine shutter and to disengage and engage said portion from said retracting means each time that said release means is moved respectively to disengage and engage said clutch member.

6. In a photographic apparatus, the combination with a casing having a frame member provided with an exposure aperture and providing a magazine chamber adapted to contain a film magazine, a cover for enclosing said magazine chamber, a film advancing means including a claw member resiliently urged into the magazine and for moving a film therein, a claw retracting means on said frame member for engaging said claw, a shutter operating means rotatably mounted on said frame member for detachably engaging a shutter member of the film magazine in said chamber, having a circular toothed sector, and movable to open and close said shutter member, an actuating means slidably mounted on said frame member and having a rack portion for engaging the toothed sector on said shutter operating means and a portion for disengaging and engaging said claw retracting means to permit said claw to enter into or to be retracted from the magazine, and a manually operable release means slidably mounted on said casing for disengaging and engaging said film advancing means, of an intermediate means actuated by said manually operable release means and operating said actuating means to rotate said shutter operating means to open said shutter and to disengage said portion from said claw retracting means before said film advancing means is released.

HENRY N. FAIRBANKS.

REFERENCES CITED

The following references are of record in the file of this patent:

UNITED STATES PATENTS

| Number | Name | Date |
|---|---|---|
| 2,011,350 | Wittel | May 13, 1935 |
| 2,080,021 | Wittel | May 11, 1937 |
| 2,211,334 | Lechleitner | Aug. 13, 1940 |
| 2,262,570 | Wittel | Nov. 11, 1941 |
| 2,319,530 | Bolsey | May 18, 1943 |
| 2,357,158 | Zuber | Aug. 29, 1944 |
| 2,462,083 | Foster | Feb. 22, 1949 |